Aug. 22, 1939.  A. E. DRISSNER  2,170,633

STOCK STOP

Filed Feb. 23, 1938  4 Sheets-Sheet 1

INVENTOR
Alfred E. Drissner
BY
ATTORNEY

Aug. 22, 1939.   A. E. DRISSNER   2,170,633
STOCK STOP
Filed Feb. 23, 1938   4 Sheets-Sheet 2

INVENTOR
Alfred E. Drissner
BY
ATTORNEY

Aug. 22, 1939.    A. E. DRISSNER    2,170,633
STOCK STOP
Filed Feb. 23, 1938    4 Sheets-Sheet 3

INVENTOR
Alfred E. Drissner.
BY
ATTORNEY

Aug. 22, 1939.　　　A. E. DRISSNER　　　2,170,633
STOCK STOP
Filed Feb. 23, 1938　　　4 Sheets-Sheet 4
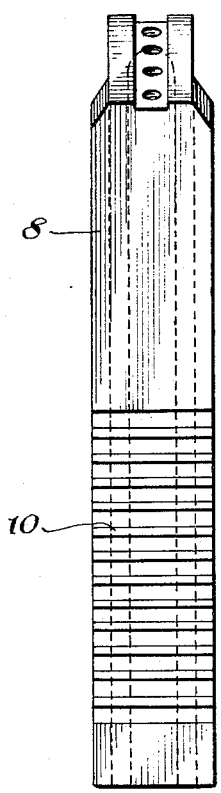
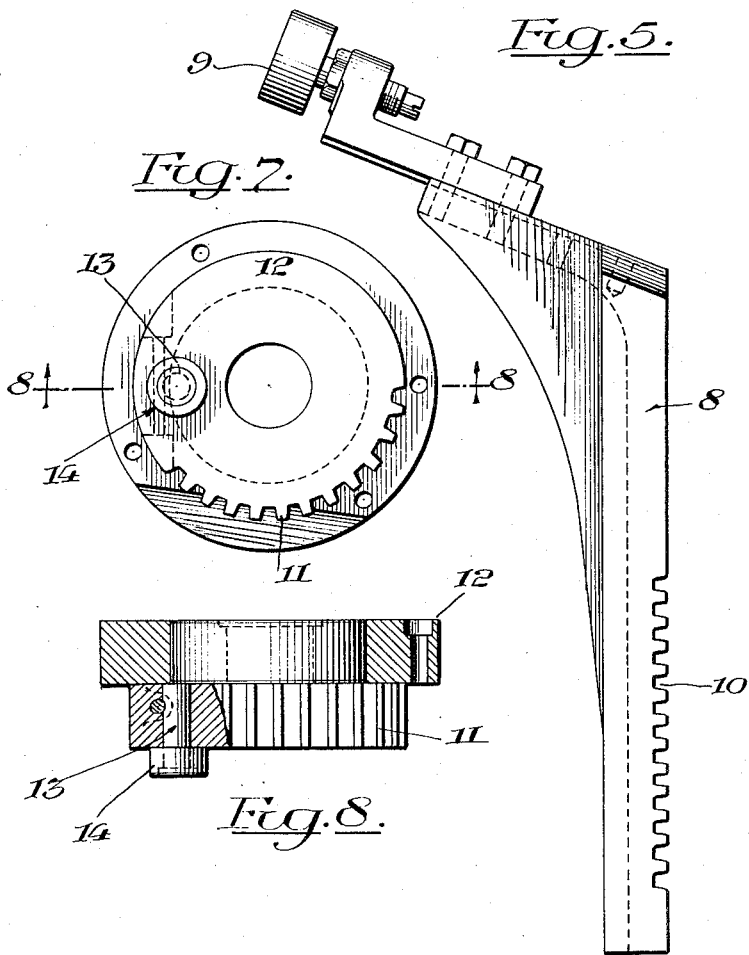
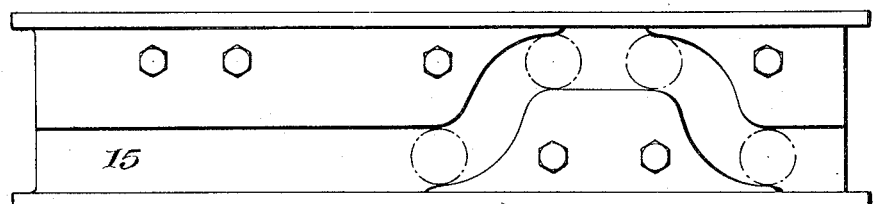
INVENTOR
Alfred E. Drissner
BY
ATTORNEY Patented Aug. 22, 1939

2,170,633

UNITED STATES PATENT OFFICE 2,170,633

STOCK STOP

Alfred E. Drissner, Cleveland, Ohio, assignor to The National Acme Company, Cleveland, Ohio, a corporation of Ohio Application February 23, 1938, Serial No. 192,018

14 Claims. (Cl. 29—37)

This invention relates to an improvement in work or stock stops for automatic spindle machines of the bar stock type and, more particularly, to that type of stock stop commonly designated as a disappearing stock stop and has for its principal object the provision of a stock stop which, when withdrawn to an inoperative position, will be out of the way of the operating tools and in such position that greater clearance between the stock stop and the work will be afforded for chips falling during the tooling operations of the machine.

A further object of the present invention is the provision of a stock stop having a long movement toward and from the work to provide for adequate space between the stock stop and the tools and work to permit the use of standard tool holders in the bar feeding position.

A still further object of the present invention is the provision of means for shifting the stock stop from the work endwise so that sufficient clearance will be afforded between the stock stop and work to permit the proper indexing of the machine in the event chips accumulate between the stock stop and the work.

A still further object of the invention is the elimination of levers for operating the stock stop and the provision of a simple and efficient operating means therefor.

In spindle machines, especially of the multiple spindle type, the work stops commonly employed have usually been positioned either to swing or to move in a vertical plane but one of the difficulties with such stock stops has been that there is insufficient chip clearance between the stock stop and stock bar to be operated upon with the result that chips not infrequently become massed between the stock stop and the work and, further, they interfere with the proper tooling of the machine. By the present improvement, however, by locating the stock stop directly under the main tool slide in its inoperative position and by shifting it from this position upwardly and toward the stock rod to be stopped, a greater clearance is obtained between the work and the stock stop when the stock stop is in its inoperative position so that greater chip clearance underneath the work spindles between the two lower forming or cross slides is provided which is very important in all automatic multiple spindle machines especially when working on alloy steels since it very materially increases the chip room than is possible with the vertically movable stock stop or the swinging stock stop heretofore used while, at the same time, the operating mechanism therefore is very much simplified for it will be observed that, in the present improvement, the stock stop is moved both away from the end of the bar in the axial plane of that bar and also below it after the bar is fed out so as to entirely clear the bar when the spindle carrier indexes and this increased chip room is very important in multiple spindle machines.

In other words, in the present improvement, the stock stop is not only shifted below the stock rod as is the case with the vertically movable stock stop and swinging stock stop but is shifted endwise away from the stock rod.

In the drawings accompanying and forming a part of this specification, Fig. 1 is a partial side elevation of a machine showing this improved work stop.

Fig. 5 is a side elevation of the work stop.

Fig. 6 is a front elevation of Fig. 5 with the work engaging member removed.

Fig. 7 is an inverted view of the interrupted gear for operating the work stop and its locking collar.

Fig. 8 is a partial section of Fig. 7 on the line 8—8, and

Fig. 9 is a development of the operating cam for actuating the gear.

Similar characters of reference indicate corresponding parts in the several views.

Figure 1:
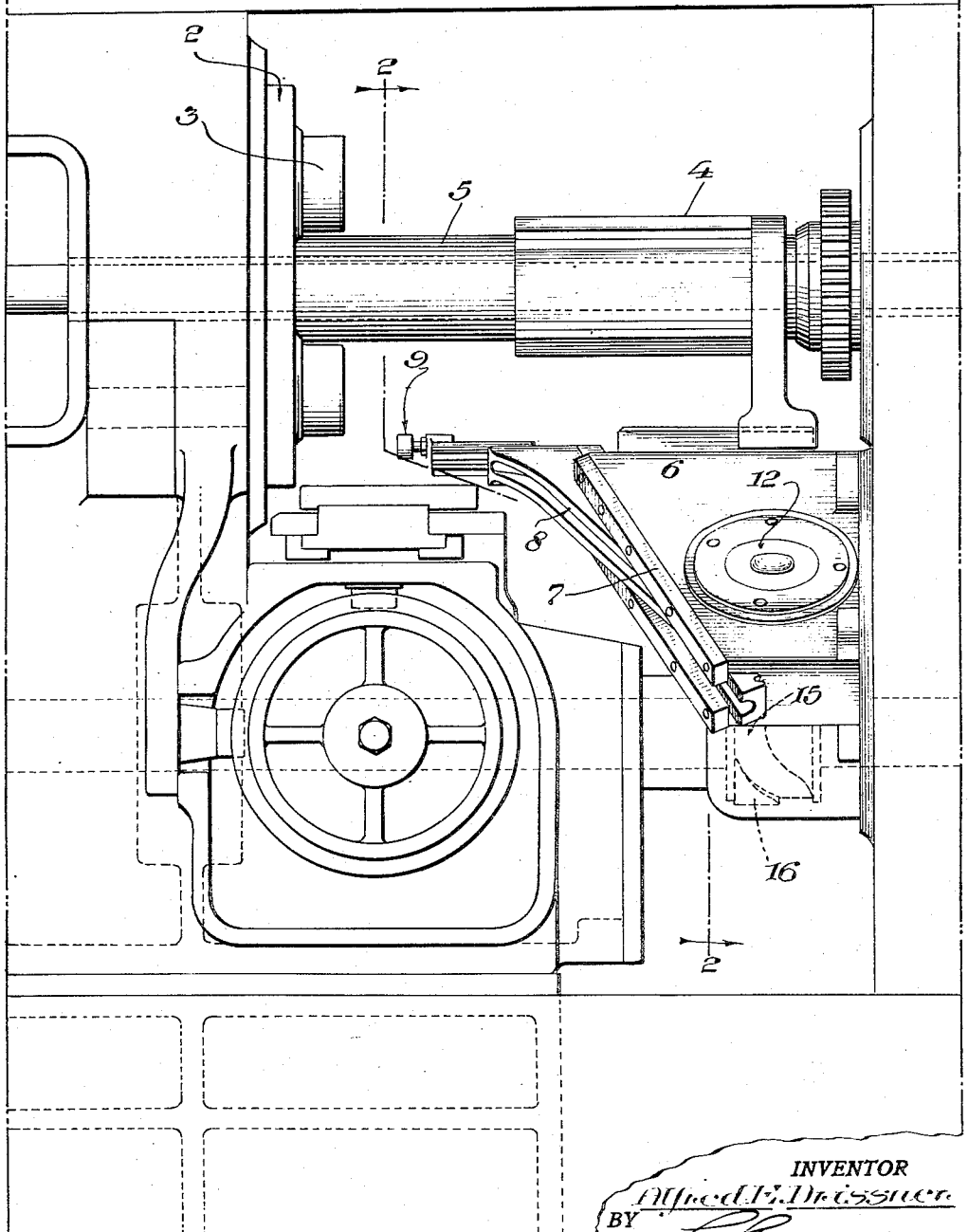

Before explaining in detail the present improvement and mode of operation thereof, I desire it understood that the invention is not limited to the details of construction and arrangement of parts illustrated in the accompanying drawings since the invention is capable of other embodiments, and that the phraseology employed is for the purpose of description and not of limitation.

The machine comprises the usual rotatable spindle carrier 2 having work supporting spindles 3 and a sliding tool carrier 4 mounted for sliding movement on the tubular shaft 5 and having a guide bracket 6.

In the present instance, the front face 7 of the guide bracket 6 is angularly formed and provision is made in this angular face to carry slidably the stock stop bar 8 and removably secured at the top thereof is the stock stop engaging member 9.

Figure 2:
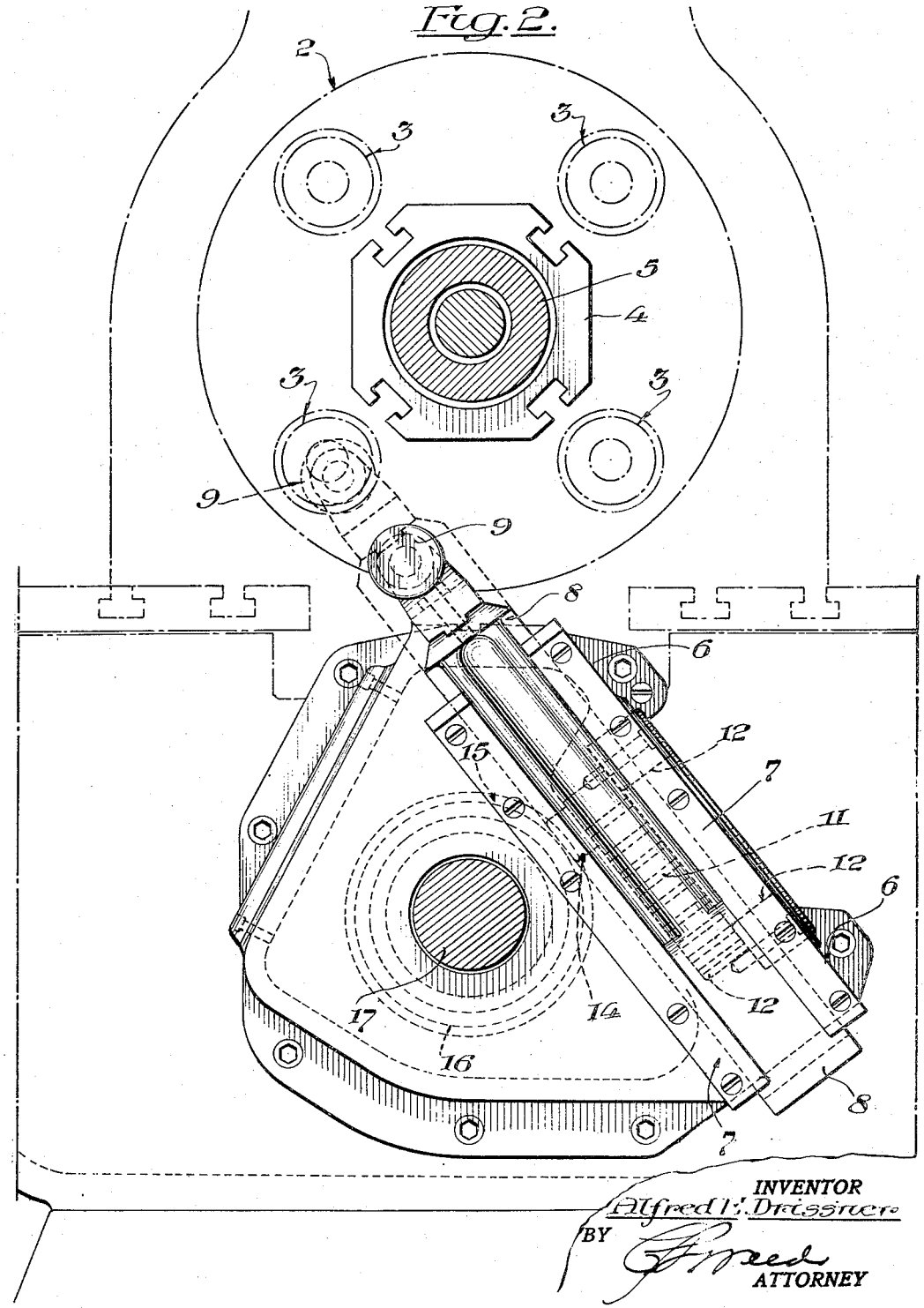
Fig. 2 is a transverse vertical section on the line 2—2 of Fig. 1, looking in the direction of the arrows.
Figure 3:
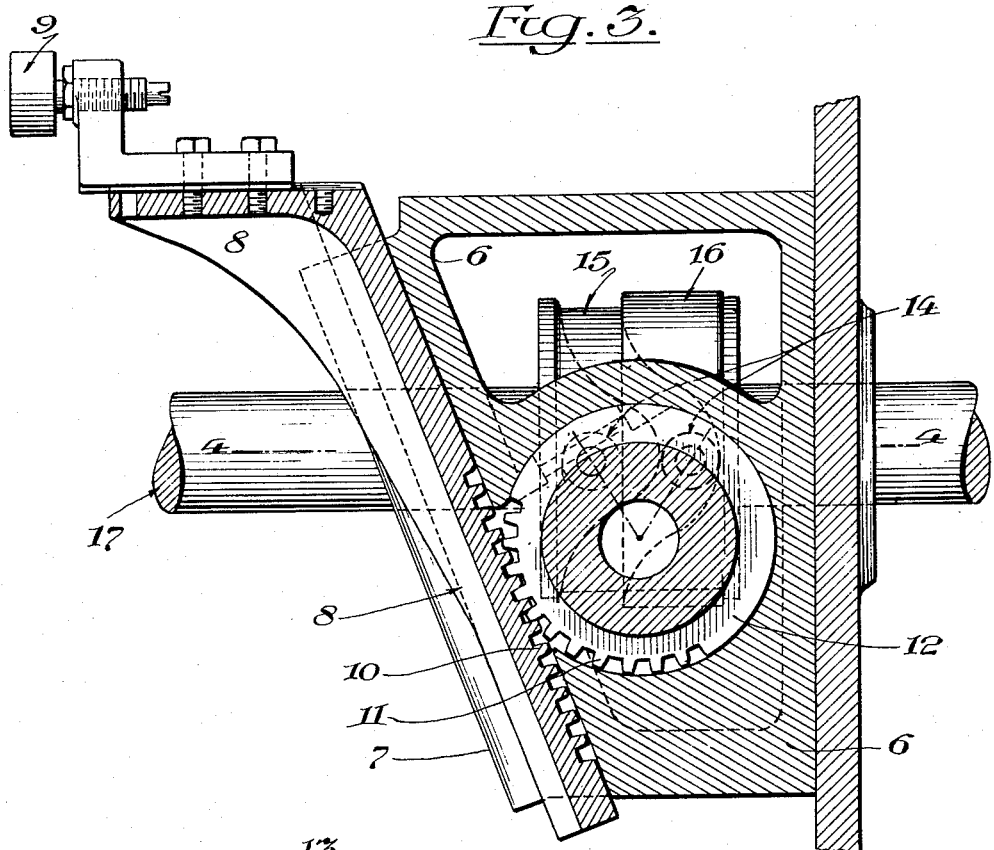
Fig. 3 is a vertical section of the work stop and support therefor.
Figure 4:
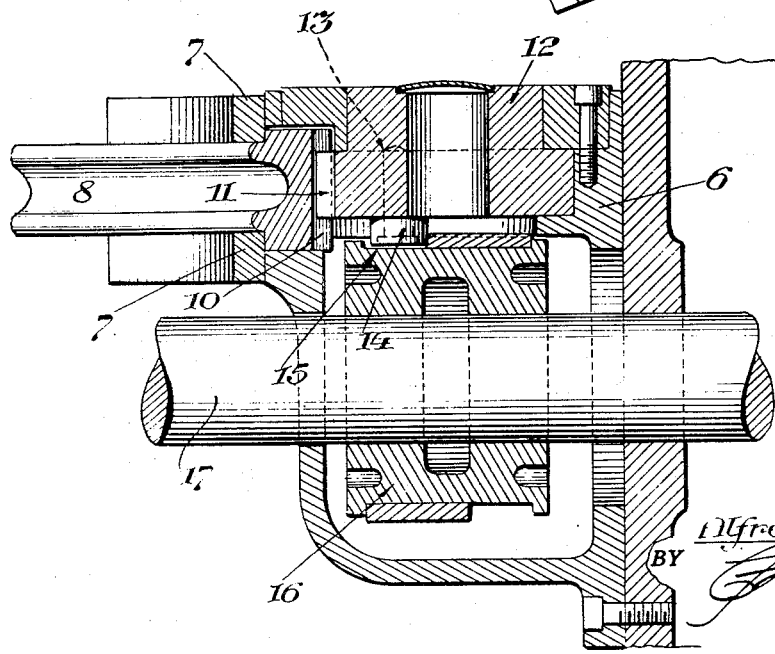
Fig. 4 is a vertical section taken on the line 4—4 of Fig. 3.

The angular face 7 of the guide bracket 6 is located in a plurality of transverse angles to the machine, as indicated in Figs. 1, 2 and 3, permitting the stock stop to be located below the tool carrier when it is lowered into inoperative position so that during the receding movement it will move a considerable distance away from the work. This location of the stock stop not only places it in a position to be entirely out of the way of the operating parts of the machine but also allows more clearance during the indexing of the machine and permits the use of standard tool holders in the stock feeding position and prevents chips falling on the stock stop in view of the additional chip space provided.

The stock stop bar 8 is provided with a series of rack formed teeth 10 in position to engage teeth 11 of an interrupted gear 12. This gear 12 is provided with a pin or stud 13 carrying a roller 14 which engages a cam slot 15 of a cam drum 16 mounted on the rotatable cam shaft 17 of the machine. A development of this cam drum is shown in Fig. 9.

During the tooling operations and the indexing of the spindle carrier, the roller 14 rides along the straight portion of this cam slot or guide 15 shown at the lower portion of the cam drum 16 in Fig. 9 and at the time the stock feeding takes place the roller rides up one inclined portion thereby revolving the gear 12 about 60 degrees. This rotation of the gear 12 causes the stock stop bar 8 to be raised transversely in position so that the stock stop will engage the work or stock bar being fed through the spindle as indicated in dotted lines in Fig. 2, thereby properly positioning the stock for the tooling operations.

After the stock bar has been properly positioned in the machine, the continued rotation of the cam drum 16 causes the roller 14 to descend the other inclined portion of the cam guide 15 which rotates the gear 12 in the opposite direction and returns the stock stop to its inoperative position below the tool carrier.

Thus, it will be observed that I have provided a stock stop with a relatively long movement, the stop simultaneously raising and shifting toward the work and vice versa in a transverse angular direction instead of the usual raising and lowering or swinging movement as heretofore in machines of this type.

Furthermore, it will be observed that the operating mechanism is very simple in that there are no levers or other similar means, but an oscillating gear operated by direct engagement with a cam drum carried by the cam shaft of the machine.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A spindle machine having a sliding tool carrier, a stationary tool carrier guide bracket at the under side of said carrier and having an inclined front end face, a work stop supported by and movable along said face, and means for shifting it.

2. A spindle machine having a sliding tool carrier, a stationary tool carrier guide bracket at the under side of said carrier and having a front end face located at a plurality of angles to the machine, a work stop supported by and movable along said face, and means for shifting it.

3. A spindle machine having a sliding tool carrier, a tool carrier guide bracket having a front end face located at a plurality of angles to the machine, a work stop supported by and movable along said face, and means for shifting it.

4. A spindle machine having a sliding tool carrier, a stationary tool carrier guide bracket having a front end face located at a plurality of angles to the machine, a work stop supported for movement on said angular face, and means carried by the guide bracket for effecting movement of said stop.

5. A spindle machine having a sliding tool carrier, a stationary tool carrier guide bracket having a front end face located at a plurality of angles to the machine, a work stop supported for movement on said angular face, and means carried by the guide bracket for effecting movement of said stop and comprising an oscillating member.

6. A spindle machine having a sliding tool carrier, a stationary guide bracket for said carrier and having a face located at a plurality of angles to the machine, a work stop supported for movement on said angular face, and means carried by the guide bracket for effecting movement of said stop and comprising an oscillating member, a cam shaft and means carried thereby for oscillating said member.

7. A spindle machine having a sliding tool carrier, a stationary guide bracket for said carrier and having a face located at a plurality of angles to the machine, a work stop supported for movement on said angular face, and means carried by the guide bracket for effecting movement of said stop and comprising an oscillating member, a cam shaft, and means carried thereby for oscillating said member and comprising a cam drum.

8. In a machine having a work spindle carrier and a sliding tool carrier, a work stop supported for up and down movement and, simultaneously, movement in the axial plane of the work spindle toward and from said spindle, and means for shifting said stock stop and comprising an oscillatory gear having a cam roller thereon and a cam drum in engagement therewith.

9. In a machine having a work spindle carrier and a sliding tool carrier, a work stop supported in transversely inclined planes for up and down movement and, simultaneously, movement in the axial plane of the work spindle toward and from said spindle, and means for shifting said stock stop and comprising an oscillatory gear having a cam roller thereon and a cam drum in engagement therewith.

10. A spindle machine having a sliding tool carrier, a guide bracket therefor, a work stop supported by and movable along one face of the guide bracket, an oscillating member engaging and operating said stock stop and having a cam roller thereon, and a cam drum engaging said cam roller for oscillating said oscillating member.

11. A spindle machine having a sliding tool carrier, a guide bracket therefor, a work stop supported by and movable along one face of the guide bracket, an oscillating member engaging and operating said stock stop and having a cam roller thereon, and a cam drum engaging said cam roller for oscillating said oscillating member, said oscillating member also carried by the guide bracket.

12. A spindle machine having a sliding tool carrier, a guide bracket therefor, a work stop movable in a plurality of inclined transverse planes along a face of the guide bracket extending in a plurality of inclined transverse planes, an oscillating member carried by the guide bracket and having a cam roller thereon, and a cam drum engaging said cam roller for oscillating said oscillating member.

13. A spindle machine having a sliding tool carrier, a guide bracket therefor having a face inclined in a plurality of transverse planes, and a work stop supported by and movable along said inclined face of the guide bracket, said stop in inoperative position located below the tool carrier.

14. A spindle machine having a sliding tool carrier, a guide bracket therefor having a face inclined in a plurality of transverse planes, a work stop supported by and movable along said inclined face of the guide bracket, said stop in inoperative position located below the tool carrier, and an oscillating member having a cam thereon carried by the guide bracket for operating said stock stop, and a cam drum in engagement with said cam for oscillating said oscillating member.

ALFRED E. DRISSNER.